United States Patent
Farcy

(10) Patent No.: US 9,574,645 B2
(45) Date of Patent: Feb. 21, 2017

(54) RACK STEERING CONTROL PISTON

(71) Applicant: MESSIER-BUGATTI-DOWTY, Velizy-Villacoublay (FR)

(72) Inventor: Marc Farcy, Velizy-Villacoublay (FR)

(73) Assignee: MESSIER-BUGATTI-DOWTY, Velizy-Villacoublay (FR)

(*) Notice: Subject to any disclaimer, the term of this patent is extended or adjusted under 35 U.S.C. 154(b) by 188 days.

(21) Appl. No.: 14/377,038

(22) PCT Filed: Feb. 6, 2013

(86) PCT No.: PCT/EP2013/052357
§ 371 (c)(1),
(2) Date: Aug. 6, 2014

(87) PCT Pub. No.: WO2013/117607
PCT Pub. Date: Aug. 15, 2013

(65) Prior Publication Data
US 2015/0000433 A1 Jan. 1, 2015

(30) Foreign Application Priority Data
Feb. 8, 2012 (FR) ..................................... 12 51190

(51) Int. Cl.
*F16H 19/04* (2006.01)
*B64C 25/50* (2006.01)
(Continued)

(52) U.S. Cl.
CPC ............... *F16H 19/04* (2013.01); *B64C 25/50* (2013.01); *F16J 1/008* (2013.01); *F16J 1/16* (2013.01); *F16J 7/00* (2013.01); *Y10T 74/18096* (2015.01)

(58) Field of Classification Search
CPC ............... F16H 19/04; F16J 7/00; F16J 1/008; F16J 1/16; B64C 25/50; Y10T 74/18096
See application file for complete search history.

(56) References Cited

U.S. PATENT DOCUMENTS 1,701,355 A * 2/1929 Borland .................... F16J 9/10
277/449
2,779,644 A * 1/1957 Lovatt ................ F04B 39/0005
92/255
(Continued)

FOREIGN PATENT DOCUMENTS

DE          35 06 069 A1    9/1985

OTHER PUBLICATIONS

International Search Report of PCT/EP2013/052357 dated Apr. 25, 2013 [PCT/ISA/210].

*Primary Examiner* — Valentina Xavier
(74) *Attorney, Agent, or Firm* — Sughrue Mion, PLLC

(57) ABSTRACT

The invention relates to a steering actuator piston with a rack (6) for an aircraft landing gear (1) characterized in that the piston comprises a body (10) made of a lightweight alloy having an externally threaded main span (11) terminated on one side by a shoulder (12) and extended on the other side by a skirt (13), the body having screwed to it a tapped bronze bushing having on its outer wall at least one groove for receiving a seal, the skirt having a drilling to receive a pin for securing the piston to the rack, the bushing extending in service between the shoulder and the pin so that it is retained axially between the shoulder and the pin.

6 Claims, 1 Drawing Sheet

(51) Int. Cl.
*F16J 1/16* (2006.01)
*F16J 1/00* (2006.01)
*F16J 7/00* (2006.01)

(56) References Cited

U.S. PATENT DOCUMENTS

| | | | | |
|---|---|---|---|---|
| 3,173,344 | A | * | 3/1965 | Mongitore ............... F16J 1/22 403/122 |
| 3,191,264 | A | * | 6/1965 | Underwood ........... F04B 1/124 29/424 |
| 3,444,784 | A | | 5/1969 | Wengerd |
| 5,181,581 | A | * | 1/1993 | Engler .................. B62D 5/062 180/417 |
| 5,709,184 | A | * | 1/1998 | Ali ........................... F16J 1/16 123/193.6 |
| 5,836,417 | A | * | 11/1998 | Martin ................ C10M 177/00 180/417 |
| 6,155,375 | A | * | 12/2000 | Gierc ...................... B62D 5/22 180/428 |
| 6,425,316 | B1 | * | 7/2002 | Phan ......................... F16J 1/22 92/187 |
| 2006/0266140 | A1 | * | 11/2006 | Harer ...................... B62D 5/22 74/89.12 |
| 2007/0199442 | A1 | | 8/2007 | Becker et al. |

\* cited by examiner

RACK STEERING CONTROL PISTON

The invention relates to a steering actuator piston for an aircraft landing gear.

BACKGROUND OF THE INVENTION

Landing gear comprising a steerable lower part is known. This lower part generally comprises a rod mounted slidably in a casing of the landing gear against a suspension force, the rod bearing at its lower end an axle which receives one or more wheels. This landing gear bears in certain cases a collar or a sleeve mounted rotatably on the casing of the landing gear while being connected to the steerable lower part by a torque link. The collar or the sleeve is provided with a toothed ring which cooperates with the rack of a steering actuator in order to pivot the steerable lower part. By way of example, mention will be made of the auxiliary landing gear of the AIRBUS A320 which is provided with such rack actuation.

The rack is connected at its two ends to pistons which are slidably mounted with sealing in cylinders extending on either side of the landing gear so as to define therein two chambers of a hydraulic actuator.

Often, such pistons are made entirely of bronze for reasons of simplicity. However, making them in this way proves to be cumbersome. Furthermore, if in production the outside diameter of the piston does not meet the specifications, the whole of the piston is scrapped. Likewise, if in service the piston wears to the point of no longer meeting the dimension specifications, the whole of the piston must be scrapped to be replaced by a new piston.

OBJECT OF THE INVENTION

The object of the invention is to propose a more lightweight piston for a rack steering actuator.

SUMMARY OF THE INVENTION

With the aim of achieving this object, there is proposed a steering actuator piston with a rack for an aircraft landing gear, the piston comprising a body made of lightweight alloy having an externally threaded main span terminated on one side by a shoulder and extended on the other side by a skirt, the body having screwed to it a tapped bronze bushing having on its outer wall at least one groove for receiving a seal, the bushing extending between the shoulder and a pin which passes through the skirt to secure the piston to the rack.

Thus, the key to the piston, namely the body, is that it is made of a lightweight alloy which is much more lightweight than bronze. A production or service wear defect affecting the bushing leads to the scrapping of the bushing, which represents a quantity of bronze which is much less substantial than the pistons made entirely of bronze.

By bronze is meant any type of alloy containing mostly copper and tin. Preferably, however, the alloy defined by the standard AMS4690 will be adopted.

By lightweight alloy is meant any type of alloy containing mostly aluminum, in particular the lightweight alloys currently used in aeronautics, such as 2024, or else the zinc alloys of the series 7000.

BRIEF DESCRIPTION OF THE FIGURES

The invention will be better understood on reading the description which follows of a particular non-limiting embodiment with reference to the figures of the appended drawings, in which.

DETAILED DESCRIPTION OF THE INVENTION

Figure 1:
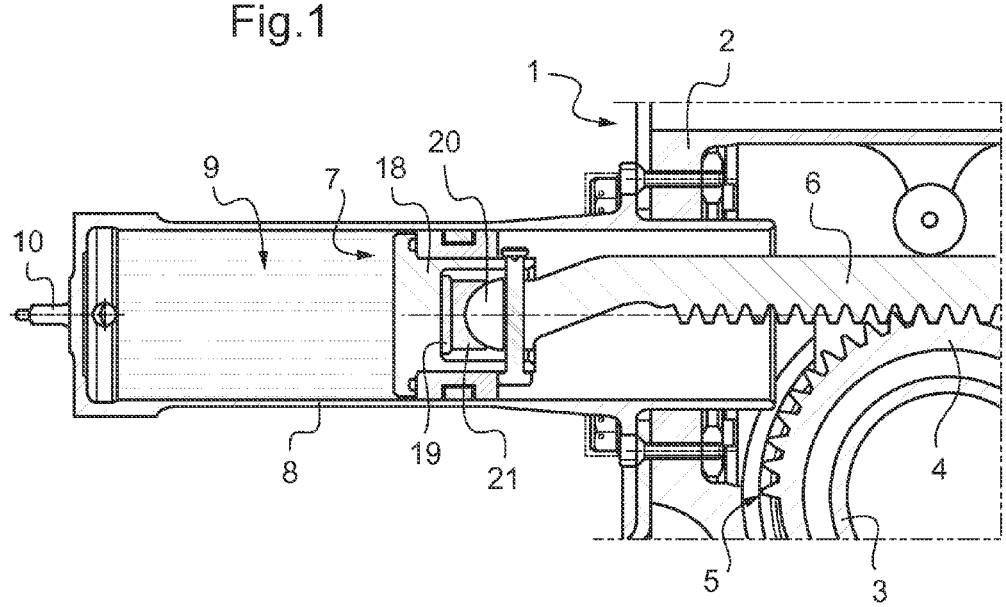
FIG. 1 is a partial sectional view of a landing gear strut provided with a steering actuator with a rack equipped with pistons according to the invention.

With reference to FIG. 1, the invention applies to the steering control of a landing gear 1 of which the casing 2 is seen in section here. In a manner known per se, a rod 3 comprising at its lower end an axle for bearing one or more wheels is mounted slidably inside the casing 2. The rod is connected by a torque link (not visible here) to a sleeve 4 which extends here inside the casing 2, around the rod 3. The sleeve 4 comprises a toothed ring 5 which cooperates with a rack 6. The movement of the rack 6 in one or other direction causes the sleeve 4 to rotate, which leads to the rotation of the rod 3, thereby steering the wheel or wheels borne by the rod 3, the assembly constituting a steerable part of the landing gear.

For this purpose, the ends of the rack 6 are each attached to a piston 7 which is mounted slidably in a sealed manner in a cylinder 8 so as to define a hydraulic chamber 9 therein. A hydraulic port 10 makes it possible to inject a flow of hydraulic fluid into the chamber 9 or recover said flow from this chamber 9.

FIG. 1 shows only one of the cylinders 8 borne by the casing 2. It is quite clear that the casing 2 bears another identical cylinder in order to receive another piston 7 attached to the other end of the rack. The two hydraulic chambers 9 thus formed define a double-acting hydraulic actuator which allows the rack to move in one or other direction.

All this is well known and is mentioned only by way of illustration.

Figure 2:
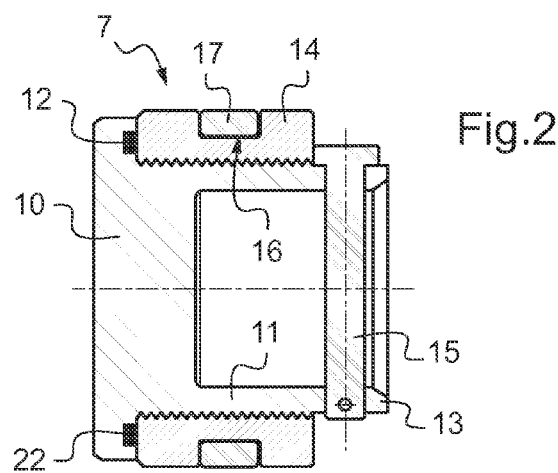
FIG. 2 is an enlarged sectional view of the piston of FIG. 1.

With reference to FIG. 2, and according to the invention, the piston 7 comprises a body 10 made of a lightweight alloy having a cylindrical and externally threaded main span 11. The main span 11 is terminated on one side by a shoulder 12 and on the other side by a skirt 13 which extends the main span 11. A bronze bushing 14 is screwed onto the main span 11. The outside diameter of the bronze bushing 14 is fitted with a slight clearance to the inside diameter of the cylinder 8. The bronze bushing 14 comprises a groove 16 to receive a seal 17 which seals the chamber 9. The bronze bushing 14 is retained axially between the shoulder 12 and a pin 15 which is engaged in a transverse drilling of the skirt and which passes through the skirt 13 in order to attach one of the ends of the rack 6 to the piston 7. In this respect, it can be seen in FIG. 1 that the end 20 of the rack 6 is configured as a hemisphere which bears on a matching shoe 21, which itself bears on a bottom 18 of the body 10 via a bearing 19. Thus, when the pressure is applied in the chamber 9, the resulting force is transmitted to the rack by thrust on its spherical end, without stressing the pin 15.

To complete the sealing of the assembly, a seal 22 is housed in a groove formed in the upright face of the shoulder 12 so as to bear against the bronze bushing 14, thereby preventing any passage of fluid via the thread of the main span 11.

The piston thus produced is much more lightweight than a piston made entirely of bronze. Moreover, in the case of nonconformity of the bushing 14, all that is required is to change the latter without replacing the whole of the piston.

The invention claimed is:

1. A steering actuator for an aircraft landing gear (1), comprising:
   a steering actuator piston (7); and
   a rack (6),
   wherein the steering actuator piston comprises a body (10), made of a metal alloy having an externally threaded main span (11) terminated on one side by a shoulder (12) and extended on the other side by a skirt (13), a tapped bronze bushing (14) and a pin (15),
   wherein the body has screwed to it the tapped bronze bushing, said bushing having on its outer wall at least one groove (16) for receiving a seal,
   wherein the skirt has a drilling to receive the pin for securing the piston to the rack, and
   wherein the bushing extends in service between the shoulder and the pin so that it is retained axially between the shoulder and the pin.

2. The steering actuator as claimed in claim 1, in which a groove is formed in an upright face of the shoulder facing the bushing in order to receive a seal (22) which bears against the bushing when the latter is screwed onto the body.

3. The steering actuator as claimed in claim 1, comprising a shoe (21) bearing on a bottom (18) of the body (1) in order to cooperate with a hemispherical end of the rack such that a pressure applied to the piston generates a force which is transmitted to the rack by thrust on its spherical end, without stressing the pin (15).

4. An aircraft landing gear comprising:
   a steerable part (3), and
   a rack steering actuator for steering the steerable part (3), the actuator comprising a rack (6) engaging with a toothed ring (5) coupled in rotation with the steerable part, the rack being selectively pushed on one or another side by means of pistons (7) attached to the rack and sliding with sealing in respective cylinders (8),
   wherein the piston comprises a body (10) made of a metal alloy having an externally threaded main span (11) terminated on one side by a shoulder (12) and extended on the other side by a skirt (13),
   wherein the body has screwed to it a tapped bronze bushing having on its outer wall at least one groove for receiving a seal,
   wherein the skirt has a drilling to receive a pin for securing the piston to the rack, and
   wherein the bushing extends in service between the shoulder and the pin so that it is retained axially between the shoulder and the pin.

5. The steering actuator as claimed in claim 1, wherein the metal alloy is selected from the group comprising aluminum alloys and zinc alloys.

6. The aircraft landing gear as claimed in claim 4, wherein the metal alloy is selected from the group comprising aluminum alloys and zinc alloys.

* * * * *